No. 743,856. PATENTED NOV. 10, 1903.
E. M. FUNK.
FISHING REEL.
APPLICATION FILED JULY 19, 1902.
NO MODEL. 2 SHEETS—SHEET 2.
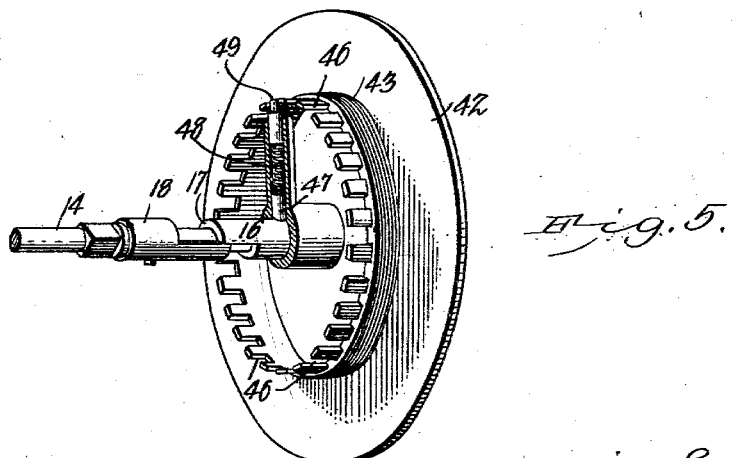
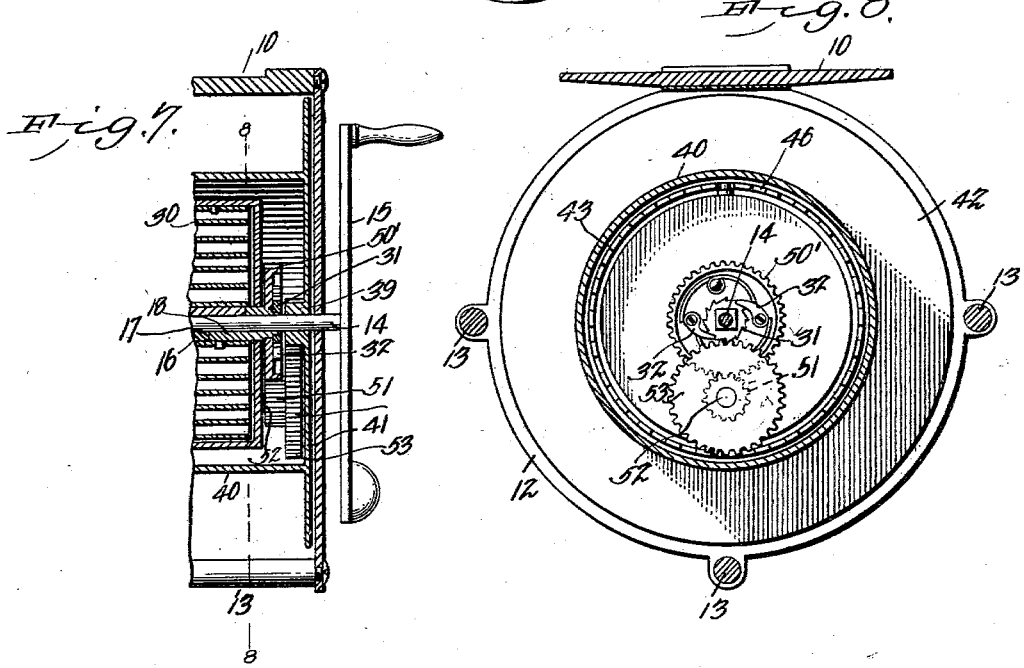
Witnesses
E. M. Funk, Inventor.
by C. A. Snow & Co.
Attorneys No. 743,856. Patented November 10, 1903.

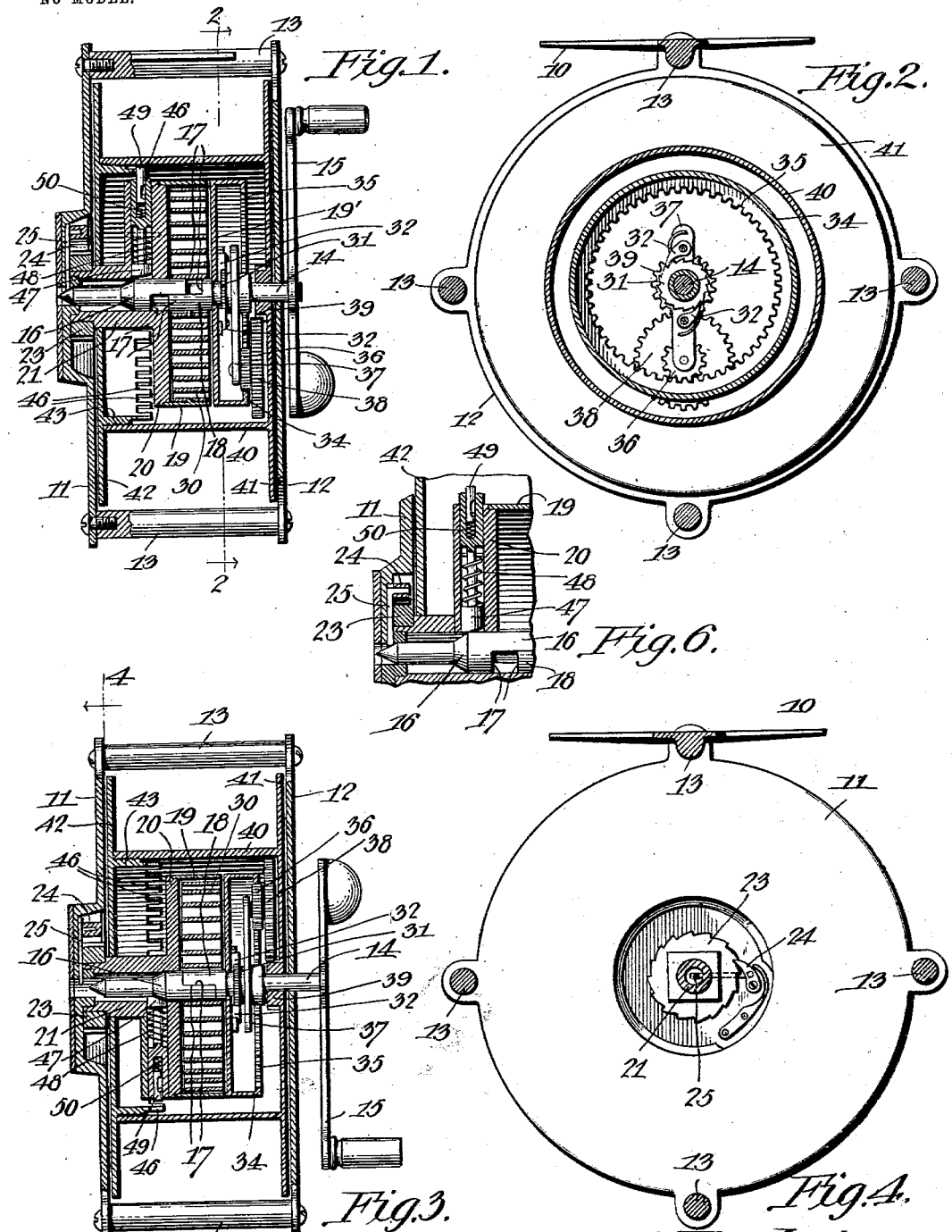

UNITED STATES PATENT OFFICE.

EDGAR M. FUNK, OF WYTHEVILLE, VIRGINIA.

FISHING-REEL.

SPECIFICATION forming part of Letters Patent No. 743,856, dated November 10, 1903.

Application filed July 19, 1902. Serial No. 116,258. (No model.)

*To all whom it may concern:*

Be it known that I, EDGAR M. FUNK, a citizen of the United States, residing at Wytheville, in the county of Wythe and State of Virginia, have invented a new and useful Fishing-Reel, of which the following is a specification.

My invention relates to certain improvements in fishing-reels of that class in which the line-spool may be wound by a spring, and has for its principal object to construct a device of this character in which the connections with the spool or reel may be readily changed to permit the winding of the spool by hand, or automatically by the employment of the winding-spring.

A further object of the invention is to provide a device of this character in which the winding-spool may be left entirely free for casting the line and in which the action of the automatic winding-spool may be retarded or accelerated at will.

A further object of the invention is to construct a combined manually-operated and automatic reel in which the spring may be wound while the reel is being turned to wind up the line by hand and kept in readiness for instant use when occasion requires.

With these and other objects in view the invention consists in the novel construction and arrangement of parts hereinafter described, illustrated in the accompanying drawings, and particularly pointed out in the appended claims.

In the accompanying drawings, Figure 1 is a longitudinal sectional elevation of a fishing-reel constructed in accordance with my invention, illustrating the parts adjusted for manual winding of the spool and line. Fig. 2 is a transverse sectional elevation of the same on the line 2 2 of Fig. 1. Fig. 3 is a view similar to Fig. 1, the parts being shown as adjusted for automatic winding. Fig. 4 is a detail sectional view of a portion of the reel on the line 4 4 of Fig. 3. Fig. 5 is a detail perspective view illustrating a structural detail. Fig. 6 is an enlarged sectional view of the locking-bolt employed for connecting the spring-barrel to the winding-spool. Fig. 7 is a view similar to Fig. 1, illustrating a modification of the transmitting-gearing. Fig. 8 is a transverse sectional elevation of the same on the line 8 8 of Fig. 7.

Similar numerals of reference are employed to indicate corresponding parts throughout the several figures of the drawings.

The invention aims principally to provide a reel of simple and economical construction capable of use either manually or automatically and in which the change from one to the other may be instantaneously effected without regard to the position of the parts.

The frame is provided with the usual bars 10, by which it may be secured to the fishing-rod by the slip-rings in ordinary use, and the main body of the frame comprises two side plates 11 and 12, connected by cross-bars 13. The two side plates of the frame are provided with centrally-disposed openings forming bearings for the support of a longitudinally-adjustable spindle 14, to one end of which is secured an operating-crank 15. To the spindle is secured a sleeve 16, of which a portion is cut away to form diametrically opposing shoulders 17, which interlock with similar shoulders on a sleeve 18, mounted loosely on said spindle. The spindle 14 is movable longitudinally to either of the positions shown in Figs. 1 and 3; but the interlocking shoulders of the two sleeves 16 and 18 are of sufficient length to remain in working contact in either position. On the spindle is mounted a spring-barrel formed of two principal members 19 and 20, the latter screwing into the end of the barrel and forming one head thereof. The head is provided with a laterally-extended hub 21, supported on the sleeve 16, and the extreme end portion of said hub is of rectangular or polygonal form for the reception of a ratchet-wheel 23 of the character best shown in Fig. 4. This ratchet-wheel is seated within a recess formed in one of the side plates of the frame, and in the recess is pivoted a spring-pressed pawl 24 adapted to engage with the teeth of the ratchet-wheel and prevent reverse movement of the barrel during the winding of the spring therein contained. The pawl 24 is operatively connected to a radially-disposed rod 25, adapted to a guiding-opening in the plate 11, the inner end of said rod being disposed in one of the bearing-openings of the spindle and in the path of movement of the tapering end of the spindle, so that when the latter is pushed into the position illustrated in Fig. 1 its tapering end will engage the rod and force the pawl out of engagement with the teeth of the ratchet-wheel, the parts being adjusted to this position when it is desired to wind the reel by hand.

The spring 30 is of spiral form and is connected at one end to the sleeve 18 and at the opposite end to the inner circular wall of the drum or barrel 19. The spindle 14 extends through a suitable opening in a loosely-mounted flanged disk 19', forming one of the barrel-heads, and is rigidly secured to a small ratchet-wheel 31, with which engages one or more pawls 32, pivotally mounted on said flanged disk 19', the pawls and ratchet-wheel permitting a turning movement of the spindle independent of the barrel and disk when it is desired to wind the spring.

When the several parts are in the position indicated in Fig. 3, the turning of the crank-handle clockwise will cause the winding up of the spring, the ratchet-wheel 23 and pawl 24 preventing a turning movement of the barrel in a corresponding direction, while the pawls 32 slip over the successive teeth of the ratchet-wheel 31 as the spring is gradually wound.

The disk 19' has an annular flange 34, in which is formed an annular rack 35, the teeth of which intermesh with the teeth of a pinion 36, mounted on an arm 37, the latter being loosely hung on the spindle and free to revolve with the pinion on said sleeve. The pinion 36 is secured to or formed integral with a gear-wheel 38, which intermeshes with a pinion 39, formed on the inner face of one of the plates of the spool or reel.

The spool or reel 40 is of comparatively large diameter and is formed by two flanged sections 41 and 42, the section 40 having a smooth surface or drum for the reception of the line and provided with internal screw-threads for the reception of a threaded flange 43 of the section 42. The section 41, which is free to rotate on the main spindle, carries the pinion 39, and the section 42 has a central opening for the passage of the hub 21 of the spring-barrel, the only connection between the spool or reel and the barrel being through the gearing when the parts are adjusted for automatic operation, as shown in Fig. 3.

In order to provide for the interlocking of the spring-barrel and the spool or reel when it is desired to wind the line by hand, I form a number of bolt-receiving notches or openings 46 in the flange 43, and in one side of the barrel-casing is formed a guide-opening for the reception of a spring-pressed bolt 47, movable in a radial line and normally pressed toward the center of rotation of the barrel by a coiled spring 48. In the head of the bolt is a guiding-opening for the reception of a locking-dog 49, normally projected by small spring 50 and adapted to engage in one or other of the notches or recesses 46.

The sleeve 16 is tapered at its outer end to form a cam for engagement with the inner end of the bolt 47, and when the spindle is thrust inwardly to the position indicated in Fig. 1 this inclined portion or cam comes into contact with the inner end of the bolt and forces the latter outward in a radial line until the dog 49 enters one or other of the notches or recesses 46, and thus locks the spring-barrel to the reel. In some cases it may only be necessary to employ a single notch or recess for the admission of the bolt; but it is preferred to increase the number in order that the two parts may be more quickly secured together. In connection with this arrangement it should be observed that in order to insure the practical operation of the device it is necessary that the locking-bolt be first moved out to engage the notches of the spool or reel in advance of the movement of the pawl 24 from the ratchet-wheel 23 in order to prevent the unwinding of the spring, although the movements may be practically simultaneous so long as the locking-pawl 24 is not completely disengaged from the ratchet-wheel until the locking-bolt has effected its outward movement. In similar manner the pawl should be reëngaged with the ratchet-wheel before the locking-bolt is disengaged from the spool or drum on the reverse movement.

When the parts are in the position indicated in Figs. 1 and 2, the spring-drum is locked directly to the spool or reel and the ratchet-wheel 23 is free to revolve in either direction, its locking-pawl 24 having been moved upwardly by the inclined or pointed end of the spindle. The spool or reel may be revolved freely in either direction by the crank, and the spool is free to run to permit casting the line. In this position the spring may or may not be wound without affecting the operation of the reel; but should it be desired to wind the spring in order that it may be held in reserve in case of an emergency the reel may be held from rotation by sufficient pressure of the thumb or finger on one of the flanges while the crank is turned to effect the winding of the spring. When wound, the spring is retained by the ratchet-wheel 31 and pawls 32 and may be instantly made effective by drawing out the spindle to the position shown in Fig. 3. In the movement of the parts from the position shown in Fig. 1 to that indicated in Fig. 3 the pointed end of the spindle first releases the rod 25 and permits the spring-pressed locking-pawl to reengage the ratchet-wheel 23 and hold the latter to the frame. A further outward movement permits the inward movement of the radially-disposed locking-bolt and unlocks the spring-barrel and spool, the device being then capable of use as an automatic take-up for the line, the speed of take-up being regulated by grasping the operating-crank, and the movement may be retarded or may be accelerated to any desired extent by turning the handle to the left or right, and so maintaining the constant strength or stress of the spring, or by permitting the spring to partially unwind and lessen its effectiveness. In this manner a fish may be played in proportion to his weight and activity and any desired strain may be exerted on the line, or if the spring prove insufficient or is accidentally broken a slight longitudinal movement of the spindle is all that is necessary to instantly change the reel from an automatic to a manually-operated device.

The construction is susceptible of various modifications, especially as regards the gearing connections between the spool or reel and its driving mechanism. One modification which has proved effective in practice is illustrated in Figs. 7 and 8, wherein the small ratchet-wheel 31 is connected by its pawl 32 to a gear-wheel 50', loosely mounted on the end of the sleeve 18, being locked to said sleeve in one direction of movement by the pawls and ratchet-wheel, but free to move in the opposite direction. The gear-wheel 50 intermeshes with a pinion 51, mounted on a stud 52, projecting from one side of the spring-barrel, and secured to and formed integral with said pinion is a gear-wheel 53, which intermeshes with the pinion 39 on the inner face of the spool or reel. The operation of this portion of the mechanism is substantially the same as that shown in Figs. 1 and 2, while in other respects the construction and arrangement of the movable spindle and the locking and unlocking devices are precisely the same as that previously described.

The reel possesses but few parts and is of economical construction, as well as possessing considerable strength, and is not likely to get out of order or require frequent repairs. If the automatic mechanism should become broken and disarranged from any cause, it is merely necessary to force the spindle into the position shown in Fig. 1 to form a hand-reel of ordinary appearance.

While the construction herein described, and illustrated in the accompanying drawings, is the preferred form of the device, it is obvious that various changes in the mechanism for adjusting the device for use either as an automatic or hand-actuated reel may be made without departing from the spirit or sacrificing any of the advantages of the invention.

Having thus fully described my invention, what I claim is—

1. A fishing-reel comprising a spool or reel, a spring-actuated drum indirectly connected with the spool or reel and adapted to actuate the same, and means for locking the drum and reel to each other to permit the winding of the spool or reel by hand.

2. In a fishing-reel, a spool, a spring barrel or drum, a spindle, a spring connecting the spindle and barrel, gearing connections between the barrel and spool, and means under the control of the spindle for locking the barrel to the spool.

3. In a device of the class specified, a spring-actuated spool, a longitudinally-adjustable spindle, a hand-crank connected thereto, and means under the control of the spindle and crank for connecting the latter to the spool.

4. In a device of the class specified, a spool, a spring barrel or drum, a longitudinally-adjustable spindle, a spring connecting the spindle and barrel, gearing connections between the barrel and spool, and means under the control of the spindle for locking the barrel to the spool.

5. In a device of the class specified, a spool, a barrel having a gearing connection with the spool, a locking device adapted to interlock the barrel and spool, and means under the control of the hand-crank for adjusting said locking device to locking or unlocking position.

6. In a device of the class specified, a spool, a spring-barrel, a longitudinally-movable spindle on which said barrel is mounted, a winding-spring connecting the spindle and barrel, means for transmitting the movement of the spring to the spool, and a locking mechanism under the control of the spindle for interlocking the spool and barrel.

7. In a device of the class specified, a supporting-frame, a spindle mounted therein and adjustable longitudinally thereof, a winding-spool, a spring drum or barrel, a spring connecting the spindle to the drum or barrel, means for transmitting the movement of the spring to the spool, means for locking the barrel to the frame in one direction of movement, a locking means for uniting the spring drum or barrel to the spool, and means controlled by the spindle for unlocking the drum or barrel from the frame and for moving the drum and spool-locking means to operative position.

8. In a device of the class specified, a frame, a longitudinally-adjustable spindle mounted therein, a winding-spool, a spring-barrel arranged within the spool, a spring connecting the spindle and barrel, a ratchet-wheel carried by the barrel, a pawl movable to operative and inoperative positions by movement of the spindle, said pawl being carried by the frame and engaging said ratchet-wheel, and a cranked arm connected to said spindle.

9. In a device of the class specified, a frame, a spindle mounted therein, a spool having a bolt-receiving recess, a spring-barrel arranged within the spool, a spring connecting the spindle and barrel, a gearing connection for transmitting the movement of the spring to the spool, a spring locking-bolt carried by the barrel and adapted to engage in the bolt-receiving recesses of the spool, and a spindle-actuated cam for moving said bolt to locking position.

10. In a device of the class specified, a frame, a spool, a spindle carried by the frame and movable longitudinally thereof, a spring-barrel, a fixed cam-collar on the spindle, a loose sleeve mounted on the spindle and having shoulders for engagement with similar shoulders on the collar, a spring connecting the sleeve and barrel, gearing connections for transmitting the unwinding movement of the spring to the spool, a ratchet-wheel carried by the barrel, a pawl carried by the frame and engaging said ratchet-wheel, a pawl-actuating bar guided in the frame and projecting into the path of movement of the spindle, and a spring-pressed locking-bolt movable by the cam-collar to interlock the barrel and spool.

11. In a device of the class specified, a frame, a longitudinally-movable spindle mounted in the frame, a cam-collar secured to the spindle, a spool having a bolt-receiving recess, a spring-barrel having a laterally-projecting hub mounted on the cam-collar, a ratchet-wheel secured to the hub, a pawl carried by the frame and adapted to engage said ratchet-wheel, a pawl-actuating bar guided in the frame and projecting into the path of movement of the spindle, a spring-pressed locking-bolt carried by the barrel and operable by said cam-collar, a locking-dog arranged at the outer end of the bolt and adapted to engage the bolt-receiving recess of the spool, a loose sleeve mounted on the spindle and having shoulders for interlocking with the cam-collar, a spring connecting the barrel and sleeve, a ratchet-wheel secured to the sleeve, pawls carried by the barrel and engaging said ratchet-wheel, a revoluble arm mounted on the spindle, a pinion and gear-wheel carried by said arm, an internal rack formed on the barrel and engaging the pinion, and a pinion carried by the spool and intermeshing with said gear-wheel.

12. In a device of the class specified, a frame, a spring-actuated spool, a longitudinally-adjustable cranked spindle for controlling the movement of both the spring and the spool, and a locking and unlocking means under the control of the cranked spindle.

In testimony that I claim the foregoing as my own I have hereto affixed my signature in the presence of two witnesses.

EDGAR M. FUNK.

Witnesses:
WM. H. BLAMBERG,
WALTER L. CLARK.